United States Patent
Kagawa et al.

(10) Patent No.: US 8,208,819 B2
(45) Date of Patent: Jun. 26, 2012

(54) OPTICAL SIGNAL GENERATOR

(75) Inventors: Masatoshi Kagawa, Tokyo (JP); Hitoshi Murai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 304 days.

(21) Appl. No.: 12/659,295

(22) Filed: Mar. 3, 2010

(65) Prior Publication Data
US 2010/0247097 A1 Sep. 30, 2010

(30) Foreign Application Priority Data
Mar. 24, 2009 (JP) .................................. 2009-071109

(51) Int. Cl.
*H04B 10/04* (2006.01)
(52) U.S. Cl. ............ 398/188; 398/91; 398/201; 359/279
(58) Field of Classification Search .................... 398/45, 398/90–91, 188–190, 201; 359/279
See application file for complete search history.

(56) References Cited

U.S. PATENT DOCUMENTS

| 7,116,460 | B2 * | 10/2006 | Griffin | 359/245 |
| 7,936,998 | B2 * | 5/2011 | Akiyama | 398/195 |
| 7,974,542 | B2 * | 7/2011 | Kagawa | 398/188 |

FOREIGN PATENT DOCUMENTS

| JP | 2001-036505 A | 2/2001 |
| JP | 2008-167126 A | 7/2008 |

* cited by examiner

*Primary Examiner* — Leslie Pascal
(74) *Attorney, Agent, or Firm* — Rabin & Berdo, P.C.

(57) ABSTRACT

An optical signal generator includes a splitter, a first modulator, a second modulator, a signal-switching unit and a multiplexer. The splitter splits an optical pulse train into a first pulse train and a second pulse train. The first modulator receives the first pulse train and first data signal, and generates a first modulation signal by performing on-off-keying or phase modulation on the first pulse train based on the strength of the first data signal. The second modulator receives the second pulse train and second data signal, and generates a second modulation signal by performing the on-off-keying or phase modulation on the second pulse train based on the strength of the second data signal. The signal-switching unit delays pulses of the second modulation signal or adjusts a phase of a carrier included in the second modulation signal according to a switching signal. The multiplexer generates an optical modulation signal by multiplexing the first modulation signal and the second modulation signal.

8 Claims, 4 Drawing Sheets

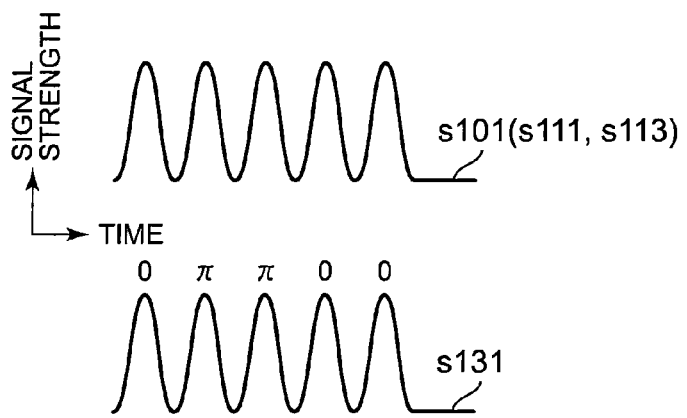
FIG. 4A
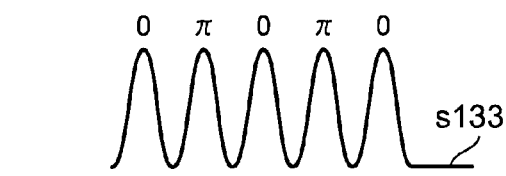
FIG. 4B
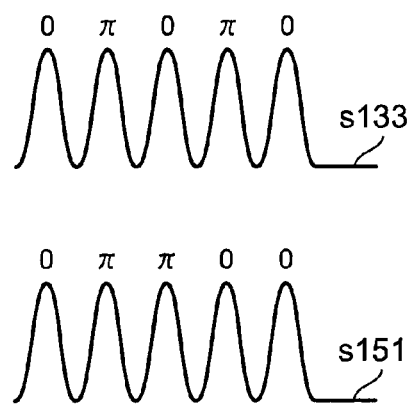
FIG. 4C
FIG. 4D
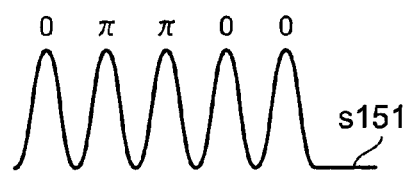
FIG. 4E
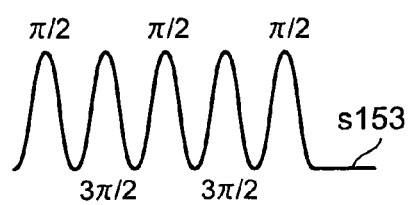
FIG. 4F
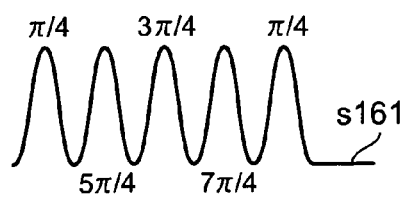

OPTICAL SIGNAL GENERATOR

CROSS-REFERENCE TO RELATED APPLICATION

This application claims priority based on 35 USC 119 from prior Japanese Patent Application No. P 2009-071109 filed on Mar. 24, 2009, the entire contents of which are incorporated herein by reference.

BACKGROUND OF THE INVENTION

1. Field of the Invention

This application relates to an optical signal generator, and more particularly to an optical signal generator that generates various types of optical modulation signals.

2. Description of the Related Art

An optical time division multiplex (hereinafter, referred to as "OTDM") technique, which is a signal multiplexing technique suitable for an optical transmission system capable of transmitting a great deal of data fast, is well known. With the OTDM technique, optical signals transmitted in multiple channels are multiplexed into one signal with a predetermined wavelength by switching the channels at regular time intervals.

A polarization time division multiplex technique is also well known in relation to the OTDM technique. With the technique, optical signals in two lines are separately modulated and the modulated optical signals are multiplexed by changing a polarization state of one of them. Japanese Patent Laid-Open No. 2001-36505 discloses an optical signal generator using the polarization time division multiplex technique.

However, the aforementioned optical signal generator can generate only a signal multiplexed by the polarization time division multiplex technique. That is to say, the generator is unable to generate signals modulated by techniques other than the polarization time division multiplex technique.

SUMMARY OF THE INVENTION

An object of the application is to disclose an optical signal generator capable of generating various types of optical modulation signals from the same input signal.

An optical signal generator includes a splitter, a first modulator, a second modulator, a signal-switching unit and a multiplexer. The splitter splits an optical pulse train into a first pulse train and a second pulse train. The first modulator receives the first pulse train and first data signal, and generates a first modulation signal by performing on-off-keying or phase modulation on the first pulse train based on the strength of the first data signal. The second modulator receives the second pulse train and second data signal, and generates a second modulation signal by performing the on-off-keying or phase modulation on the second pulse train, based on the strength of the second data signal. The signal-switching unit delays pulses of the second modulation signal, or adjusts a phase of a carrier included in the second modulation signal according to a switching signal. The multiplexer generates an optical modulation signal by multiplexing the first modulation signal and the second modulation signal.

The full scope of applicability of the optical signal generator will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The optical signal generator will become more fully understood from the detailed description given herein and the accompanying drawings, which are given by way of illustration only, and thus do not limit the invention, and wherein:

FIGS. 4A to 4F are signal waveform diagrams showing an operation for generating a QPSK signal.

DETAILED DESCRIPTION OF THE INVENTION

A preferred embodiment of an optical signal generator according to the invention will be described in detail with reference to the accompanying drawings.

First Embodiment

Figure 1:
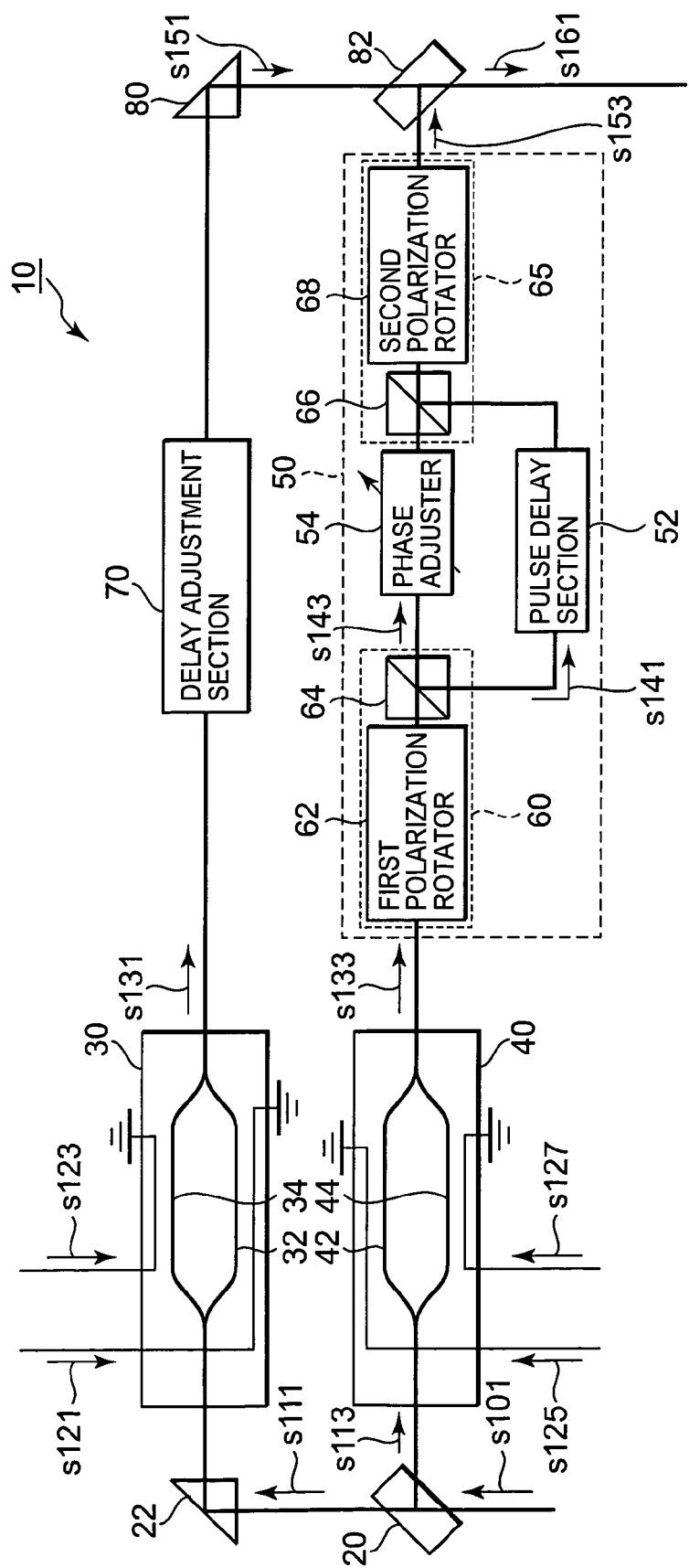
FIG. 1 is a schematic view of an optical signal generator of an embodiment.

FIG. 1 is a schematic view of an optical signal generator 10 according to an embodiment. In FIG. 1, solid lines that connect elements denote optical paths along which optical signals are transmitted. The elements may be connected through optical fiber, optical waveguides or the like. In addition, the elements may be spatially coupled.

The optical signal generator 10 may include a splitter 20, a first modulator 30, a second modulator 40, a signal-switching unit 50, a delay adjustment section 70 and a multiplexer 82. The optical signal generator 10 receives an optical pulse train s101 and outputs a predetermined optical modulation signal s161 corresponding to the optical pulse train s101. Here, the optical pulse train is defined as a pulse train in which multiple optical pulses are arranged at the same interval of time. The optical modulation signal is defined as a pulse train that reflects a binary digital signal obtained by optically modulating the optical pulse train. The optical signal generator 10 generates one of an on-off-keying (hereinafter, referred to as "OOK") signal, a binary phase-shift-keying (hereinafter, referred to as "BPSK") signal and a quadrature phase-shift-keying (hereinafter, referred to as "QPSK") signal, as the optical modulation signal s161. In other words, the optical signal generator 10 is capable of generating three different optical modulation signals.

The optical pulse train s101 input to the optical signal generator 10 is sent to the splitter 20, where the optical pulse train s101 is split into a first pulse train s111 and a second pulse train s113. The splitter 20 may be a half mirror. The first pulse train s111 reaches the first modulator 30 by changing its direction of travel at a first prism mirror 22. The second pulse train s113 reaches the second modulator 40.

The first modulator 30 may be a Mach-Zehnder modulator. The first modulator 30 receives a first data signal that consists of first data s121 and second data s123. The first data s121 and the second data s123 are the same data except that they are logically inverse to one another. In addition, the first data s121 and the second data s123 are binary digital signals that take two values of "0 (low-level)" and "1 (high-level)."

The first modulator 30 has a first arm waveguide 32 and a second arm waveguide 34. A phase of an optical pulse carrier included in the first pulse train sill that travels in the first arm waveguide 32 changes based on the first data s121. A phase of an optical pulse carrier included in the first pulse train sill that travels in the second arm waveguide 34 changes based on the second data s123. The magnitude of the phase-change varies depending on the strength of the first data signal, i.e., the first data s121 and the second data s123. As described later, the first modulator 30 performs the OOK or phase modulation on the first pulse train sill according to the strength of the first data s121 and the second data s123, and generates a first modulation signal s131.

Here, modulations performed on the first pulse train sill will be described.

First, a modulation performed on the first pulse train sill when high-level voltages of the first data s121 and the second data s123 are adjusted to half of a half-wavelength voltage $V\pi$ will be described.

When the first data s121 is "0," the phase of the optical pulse carrier included in the first pulse train sill that travels in the first arm waveguide 32 does not change, i.e., the phase is "0." At this time, the phase of the optical pulse carrier included in the first pulse train sill that travels in the second arm waveguide 34 also does not change, i.e., the phase is "0." Therefore, the first modulation signal s131, which is generated by synthesizing the optical pulse carriers from the first arm waveguide 32 and the second arm waveguide 34, is the same as the first pulse train sill input to the first modulator 30.

When the first data s121 is "1," or half of the half-wavelength voltage $V\pi$, the phase of the optical pulse carrier included in the first pulse train sill that travels in the first arm waveguide 32 advances by $\pi/2$, i.e., the phase is "+$\pi/2$." On the other hand, since the logic of the second data s123 is opposite to that of the first data s121, the phase of the optical pulse carrier included in the first pulse train sill that travels in the second arm waveguide 34 retards by $\pi/2$, i.e., the phase is "-$\pi/2$." Therefore, the optical pulses included in the first pulse train sill input to first modulator 30 disappear by synthesizing the optical pulse carriers from the first arm waveguide 32 and the second arm waveguide 34. That is to say, the first modulation signal s131 does not include the optical pulses.

Thus, when the high-level voltages of the first data s121 and the second data s123 are adjusted to half of the half-wavelength voltage $V\pi$, the first modulation signal s131 output from the first modulator 30 becomes an OOK signal, in which the presence or absence of the optical pulses is determined in accordance with "0" or "1" of the first data s121.

Next, a modulation performed on the first pulse train sill when high-level voltages of the first data s121 and the second data s123 are adjusted to the half-wavelength voltage $V\pi$ will be described.

When the first data s121 is "0," the phase of the optical pulse carrier included in the first pulse train sill that travels in the first arm waveguide 32 does not change, i.e., the phase is "0." At this time, the phase of the optical pulse carrier included in the first pulse train sill that travels in the second arm waveguide 34 also does not change, i.e., the phase is "0." Therefore, the first modulation signal s131, which is generated by synthesizing the optical pulse carriers from the first arm waveguide 32 and the second arm waveguide 34, is the same as the first pulse train sill input to the first modulator 30.

When the first data s121 is "1," or the half-wavelength voltage $V\pi$, the phase of the optical pulse carrier included in the first pulse train sill that travels in the first arm waveguide 32 advances by n, i.e., the phase is "+$\pi$." On the other hand, since the logic of the second data s123 is opposite to that of the first data s121, the phase of the optical pulse carrier included in the first pulse train sill that travels in the second arm waveguide 34 retards at $\pi$, i.e., the phase is "-$\pi$." Therefore, the phase of the optical pulse carrier included in the first modulation signal s131, which is generated by synthesizing the optical pulse carriers from the first arm waveguide 32 and the second arm waveguide 34, becomes "$\pi$."

Thus, when the high-level voltages of the first data s121 and the second data s123 are adjusted to the half-wavelength voltage $V\pi$, the first modulation signal s131 output from the first modulator 30 becomes a phase modulation signal, in which the phase of the optical pulse carrier is "0" or "$\pi$" in accordance with "0" or "1" of the first data s121.

Similarly to the first modulator 30, the second modulator 40 may be a Mach-Zehnder modulator. The second modulator 40 receives a second data signal that consists of third data s125 and fourth data s127. The third data s125 and the fourth data s127 are the same data except that they are logically inverse to one another. In addition, the third data s125 and the fourth data s127 are binary digital signals that take on two values, "0 (low-level)" and "1 (high-level)." Similarly to the first modulator 30, the second modulator 40 performs the OOK or phase modulation on the second pulse train s113 according to the strength of the third data s125 and the fourth data s127, and generates a second modulation signal s133.

The second modulation signal s133 generated by the second modulator 40 is sent to the signal-switching unit 50, where the optical pulses of the signal s133 are delayed or the phase of the optical pulse carrier included in the signal s133 is adjusted. The signal-switching unit 50 may include a pulse delay section 52, a phase adjuster 54, a first optical switch 60 and a second optical switch 65.

The first optical switch 60 sends the second modulation signal s133 to either the pulse delay section 52 or the phase adjuster 54 according to a switching signal for switching one modulation method to another. The switching signal may be a binary electrical signal. The first optical switch 60 may include a first polarization rotator 62 for rotating an axis of polarization and a first polarization beam splitter 64.

The first polarization beam splitter 64 changes the direction of travel of an optical signal input thereto according to the direction in which the axis of polarization of a carrier included in the optical signal extends. In other words, the first polarization beam splitter 64 sends the second modulation signal s133 to either the pulse delay section 52 or the phase adjuster 54, according to the direction in which the axis of polarization of the optical pulse carrier included in the second modulation signal s133 extends.

The first polarization rotator 62 may be a liquid-crystalline polarization rotator capable of rotating the axis of polarization. The first polarization rotator 62 changes a polarization state of the optical pulse carrier included in the second modulation signal s133 according to a voltage level of the switching signal. Since a liquid-crystal has large birefringence, the liquid-crystalline polarization rotator can be miniaturized advantageously. Moreover, the liquid-crystalline polarization rotator can be controlled by the electro-optic effect, thereby facilitating the control thereof.

In performing the phase modulation on the second modulation signal s133, a low-level switching signal is input to the first polarization rotator 62. According to the low-level switching signal, the first polarization rotator 62 sends the second modulation signal s133 to the first polarization beam splitter 64 without changing the polarization state of the optical pulse carrier included in the signal s133. The first polarization beam splitter 64 advances the second modulation signal s133 (s143) toward the phase adjuster 54.

On the other hand, in delaying the second modulation signal s133, a high-level switching signal is input to the first polarization rotator 62. According to the high-level switching signal, the first polarization rotator 62 changes the polarization state of the optical pulse carrier included in the second modulation signal s133 and sends it to the first polarization beam splitter 64. The first polarization beam splitter 64 changes by 90 degrees the direction of travel of the second modulation signal s133 whose polarization state has been changed. Then, the first polarization beam splitter 64 sends the second modulation signal s133 (s141) to the pulse delay section 52.

The pulse delay section 52 delays the optical pulses of the second modulation signal s133 (s141). For example, when a bit rate of an optical signal is 50 Gbps (bits per second), its optical pulses appear at intervals of 20 psec (=1/50 Gbps). Therefore, at the time of multiplexing optical signals, whose bit rates are 50 Gbps, in two lines, if the pulse delay section 52 delays one of them by 10 psec, a multiplexed optical signal whose bit rate is 100 Gbps can be obtained.

The phase adjuster 54, which may be a liquid-crystalline phase shifter, adjusts the phase of the optical pulse carrier included in the second modulation signal s133 (s143). Since a liquid-crystal has large birefringence, the liquid-crystalline phase shifter can be advantageously miniaturized. Moreover, the liquid-crystalline phase shifter can be controlled by the electro-optic effect, thereby facilitating the control thereof.

The second optical switch 65 selects one of outputs from the pulse delay section 52 and the phase adjuster 54, and sends it to the multiplexer 82. Note that the first optical switch 60 has selectively sent the second modulation signal s133 to either the pulse delay section 52 or the phase adjuster 54. Therefore, the second optical switch 65 may solely synthesize the outputs from the pulse delay section 52 and the phase adjuster 54 without selecting one of them. The second optical switch 65 may include a second polarization beam splitter 66 and a second polarization rotator 68 for rotating an axis of polarization. The second polarization beam splitter 66 may be configured in the same way as the first polarization beam splitter 64.

The second modulation signal s133 (s143) that has passed through the first polarization beam splitter 64 reaches the second polarization beam splitter 66 via the phase adjuster 54. Subsequently, the second modulation signal s133 (s143) passes through the second polarization beam splitter 66 and reaches the multiplexer 82.

On the other hand, the second modulation signal s133 (s141) whose direction of travel has been changed by 90 degrees at the first polarization beam splitter 64, reaches the second polarization beam splitter 66 via the pulse delay section 52. Subsequently, the second modulation signal s133 (s141) reaches the multiplexer 82 after its direction of travel has changed by 90 degrees at the second polarization beam splitter 66.

The second polarization rotator 68 may be configured in the same way as the first polarization rotator 62. The second polarization rotator 68 rotates an axis of polarization of an output from the second polarization beam splitter 66 by the same amount of angle in the opposite direction of rotation provided by the first polarization rotator 62 according to the switching signal. That is to say, when the polarization state of the second modulation signal s133 has been changed by rotating its axis of polarization 90 degrees in one direction by the first polarization rotator 62, the second polarization rotator 68 changes the polarization state by rotating the axis of polarization 90 degrees in the opposite direction. On the other hand, when the polarization state of the second modulation signal s133 has not been changed by the first polarization rotator 62, the second polarization rotator 68 does not change the polarization state. As a result, the axis of polarization of the second modulation signal s133 (s153) immediately after being output from the second polarization rotator 68 extends in the same direction as that of the second modulation signal s133 immediately before being input to the first polarization rotator 62.

The multiplexer 82 receives the first modulation signal s131 (s151) through the delay adjustment section 70 and a second prism mirror 80, and also receives the second modulation signal s133 (s153) through the signal-switching unit 50. The multiplexer 82 multiplexes the first modulation signal s131 (s151) and the second modulation signal s133 (s153), thereby generating the optical modulation signal s161. The multiplexer 82 may be a half mirror like the splitter 20.

The delay adjustment section 70 adjusts a time difference between the first modulation signal s131 (s151) and the second modulation signal s133 (s153), which results from a path difference between them from the splitter 20 to the multiplexer 82.

Next, operations of the optical signal generator 10 will be described with reference to FIGS. 2A to 4F.

First, an operation for generating the OOK signal will be described with reference to FIGS. 2A to 2F. FIGS. 2A to 2F are signal waveform diagrams showing the operation, in which abscissa and ordinate axes respectively denote "time" and "signal strength" in arbitrary units.

Figure 2A:
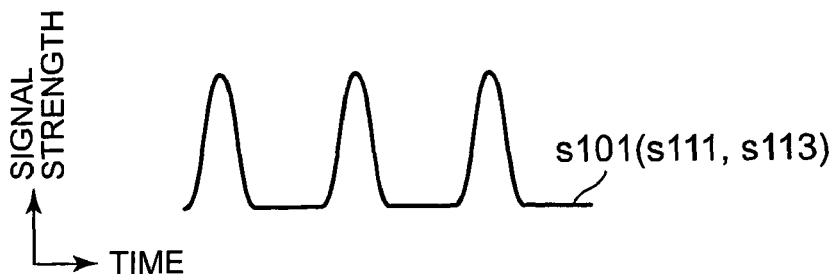
FIGS. 2A to 2F are signal waveform diagrams showing an operation for generating an OOK signal.

In FIG. 2A, the optical signal generator 10 receives the optical pulse train s101 with a frequency of 50 GHz. The splitter 20 splits the optical pulse train s101 into the first pulse train s111 and the second pulse train s113.

Figure 2B:
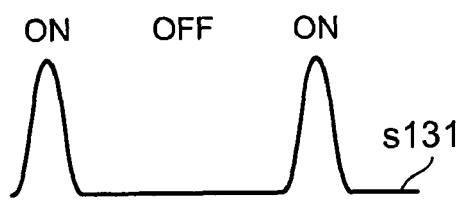

In FIG. 2B, the first modulator 30 modulates the first pulse train s111 according to the first data signal, i.e., the first data s121 and the second data s123, and generates the first modulation signal s131. Here, it is supposed that high-level voltages of the first data s121 and the second data s123 have been adjusted to half of the half-wavelength voltage Vπ. As described above, the first data s121 and the second data s123 are the same data except that they are logically inverse to one another. Therefore, the first modulation signal s131 output from the first modulator 30 becomes the OOK signal whose bit rate is 50 Gbps. FIG. 2B shows a signal waveform of the first modulation signal s131 when the first data s121 changes to "0, 1, 0" in turn.

Figure 2C:
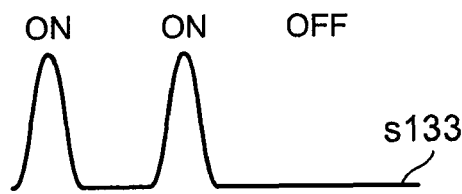

In FIG. 2C, the second modulator 40 modulates the second pulse train s113 according to the second data signal, i.e., the third data s125 and the fourth data s127, and generates the second modulation signal s133 that is the OOK signal whose bit rate is 50 Gbps. FIG. 2C shows a signal waveform of the second modulation signal s133 when the third data s125 changes to "0, 0, 1" in turn.

Figure 2D:
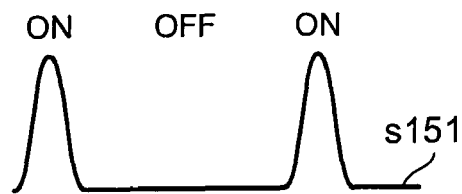
Figure 2E:
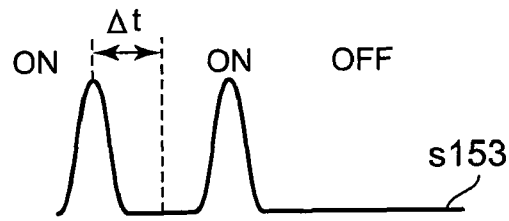

In FIGS. 2D and 2E, a time difference Δt of 10 psec is provided between the first modulation signal s131 (s151) that reaches the multiplexer 82 through the delay adjustment section 70 and the second modulation signal s133 (s153) that reaches the multiplexer 82 through the signal-switching unit 50.

Figure 2F:
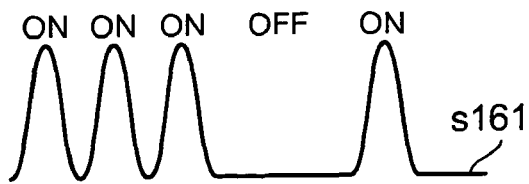

In FIG. 2F, the multiplexer 82 multiplexes the first modulation signal s131 (s151) and the second modulation signal s133 (s153), thereby generating the optical modulation signal s161 that is the OOK signal whose bit rate is 100 Gbps.

Next, an operation for generating the BPSK signal will be described with reference to FIGS. 3A to 3F. FIGS. 3A to 3F are signal waveform diagrams showing the operation, in which abscissa and ordinate axes respectively denote "time" and "signal strength" in arbitrary units.

Figure 3A:
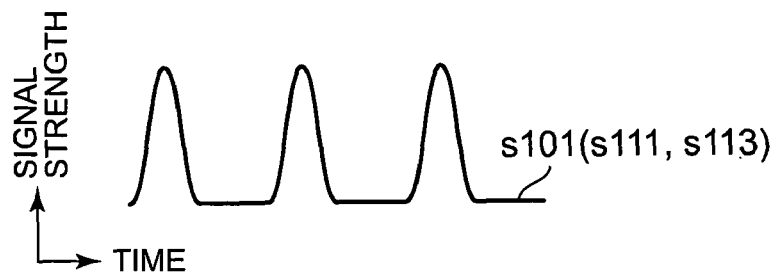
FIGS. 3A to 3F are signal waveform diagrams showing an operation for generating a BPSK signal.

In FIG. 3A, the optical signal generator 10 receives the optical pulse train s101 with a frequency of 50 GHz. The splitter 20 splits the optical pulse train s101 into the first pulse train sill and the second pulse train s113.

Figure 3B:
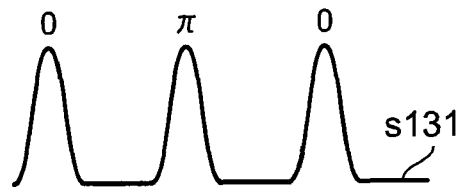

In FIG. 3B, the first modulator 30 modulates the first pulse train sill according to the first data signal, i.e., the first data s121 and the second data s123, and generates the first modulation signal s131. Here, it is supposed that high-level voltages of the first data s121 and the second data s123 has been adjusted to the half-wavelength voltage Vπ. As described above, the first data s121 and the second data s123 are the same data except that they are logically inverse to one another. Therefore, the first modulation signal s131 output from the first modulator 30 becomes the phase modulation signal whose bit rate is 50 Gbps. As shown in FIG. 3B, the phase of the optical pulse carrier included in the first modulation signal s131 changes to "0, π, 0" in turn when the first data s121 changes to "0, 1, 0" in turn.

Figure 3C:
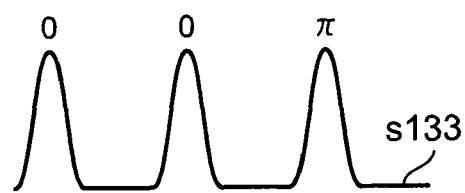

In FIG. 3C, the second modulator 40 modulates the second pulse train s113 according to the second data signal, i.e., the third data s125 and the fourth data s127, and generates the second modulation signal s133 that is the phase modulation signal whose bit rate is 50 Gbps. As shown in FIG. 3C, the phase of the optical pulse carrier included in the second modulation signal s133 changes to "0, 0, π" in turn when the third data s125 changes to "0, 0, 1" in turn.

Figure 3D:
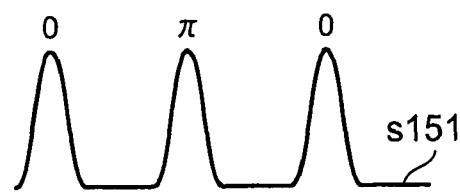
Figure 3E:
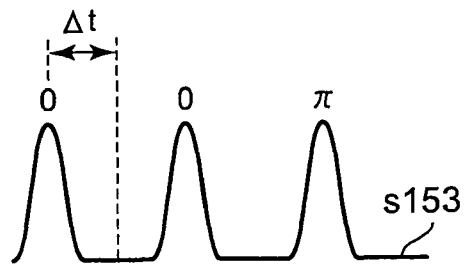

In FIGS. 3D and 3E, a time difference Δt of 10 psec is provided between the first modulation signal s131 (s151) that reaches the multiplexer 82 through the delay adjustment section 70 and the second modulation signal s133 (s153) that reaches the multiplexer 82 through the signal-switching unit 50.

Figure 3F:
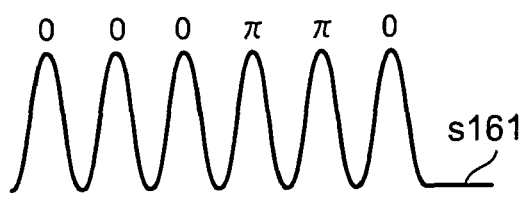

In FIG. 3F, the multiplexer 82 multiplexes the first modulation signal s131 (s151) and the second modulation signal s133 (s153), thereby generating the optical modulation signal s161 that is the BPSK signal whose bit rate is 100 Gbps.

Finally, an operation for generating the QPSK signal will be described with reference to FIGS. 4A to 4F. FIGS. 4A to 4F are signal waveform diagrams showing the operation, in which abscissa and ordinate axes respectively denote "time" and "signal strength" in arbitrary units.

In FIG. 4A, the optical signal generator 10 receives the optical pulse train s101 with a frequency of 100 GHz. The splitter 20 splits the optical pulse train s101 into the first pulse train sill and the second pulse train s113.

In FIG. 4B, the first modulator 30 modulates the first pulse train sill according to the first data signal, i.e., the first data s121 and the second data s123, and generates the first modulation signal s131. Here, it is supposed that high-level voltages of the first data s121 and the second data s123 has been adjusted to the half-wavelength voltage Vπ. As described above, the first data s121 and the second data s123 are the same data except that they are logically inverse to one another. Therefore, the first modulation signal s131 output from the first modulator 30 becomes the phase modulation signal whose bit rate is 100 Gbps. As shown in FIG. 4B, the phase of the optical pulse carrier included in the first modulation signal s131 changes to "0, π, π, 0, 0" in turn when the first data s121 changes to "0, 1, 1, 0, 0" in turn.

In FIG. 4C, the second modulator 40 modulates the second pulse train s113 according to the second data signal, i.e., the third data s125 and the fourth data s127, and generates the second modulation signal s133 that is the phase modulation signal whose bit rate is 100 Gbps. As shown in FIG. 4C, the phase of the optical pulse carrier included in the second modulation signal s133 changes to "0, π, 0, π, 0" in turn when the third data s125 changes to "0, 1, 0, 1, 0" in turn.

In FIGS. 4D and 4E, the phase adjuster 54 advances the phase of the optical pulse carrier included in the second modulation signal s133 (s143) by π/2. As a result, the phase of the optical pulse carrier included in the second modulation signal s133 (s153) output from the signal-switching unit 50 changes to "π/2, 3π/2, π/2, 3π/2, π/2" in turn. In this case, a time difference Δt is not provided between the first modulation signal s131 (s151) that reaches the multiplexer 82 through the delay adjustment section 70, and the second modulation signal s133 (s153) that reaches the multiplexer 82 through the signal-switching unit 50.

In FIG. 4F, the multiplexer 82 multiplexes the first modulation signal s131 (s151) and the second modulation signal s133 (s153), thereby generating the optical modulation signal s161 that is the QPSK signal whose bit rate is 100 Gbps.

As described above, the first modulator 30 generates the first modulation signal s131 by performing the OOK or phase modulation on the first pulse train sill based on the strength of the first data signal, i.e., the first data s121 and the second data s123. Similarly, the second modulator 40 generates the second modulation signal s133 by performing the OOK or phase modulation on the second pulse train s113 based on the second data signal, i.e., the third data s125 and the fourth data s127. Moreover, the signal-switching unit 50 delays the optical pulses of the second modulation signal s133, or adjusts the phase of the optical pulse carrier included in the signal s133 according to the switching signal. Therefore, the optical signal generator 10 is capable of generating various types of optical modulation signals from the same input signal.

What is claimed is:

1. An optical signal generator comprising:
   a splitter that splits an optical pulse train into a first pulse train and a second pulse train;
   a first modulator that receives the first pulse train and first data signal and generates a first modulation signal by performing on-off-keying or phase modulation on the first pulse train based on the strength of the first data signal;
   a second modulator that receives the second pulse train and second data signal and generates a second modulation signal by performing the on-off-keying or phase modulation on the second pulse train based on the strength of the second data signal;
   a signal-switching unit that delays pulses of the second modulation signal, or adjusts a phase of a carrier included in the second modulation signal according to a switching signal; and
   a multiplexer that generates an optical modulation signal by multiplexing the first modulation signal and the second modulation signal.

2. The optical signal generator according to claim 1, wherein the signal-switching unit includes:
   a pulse delay section that delays the pulses of the second modulation signal;
   a phase adjuster that adjusts the phase of the carrier included in the second modulation signal;
   a first optical switch that sends the second modulation signal to the pulse delay section or the phase adjuster; and
   a second optical switch that sends one output of the pulse delay section and the phase adjuster to the multiplexer.

3. The optical signal generator according to claim 2, wherein the first optical switch includes:
   a first polarization rotator that rotates an axis of polarization of the carrier included in the second modulation signal according to the switching signal;

a first polarization beam splitter that sends the second modulation signal to the pulse delay section or the phase adjuster based on a direction in which the axis of polarization of the carrier extends.

4. The optical signal generator according to claim 3, wherein the second optical switch includes:
   a second polarization beam splitter that synthesizes the outputs from the pulse delay section and the phase adjuster;
   a second polarization rotator that rotates an axis of polarization of an output from the second polarization beam splitter by the same amount of angle in the opposite direction of rotation provided by the first polarization rotator, according to the switching signal.

5. The optical signal generator according to claim 3, wherein the first polarization rotator is a liquid-crystalline polarization rotator.

6. The optical signal generator according to claim 4, wherein the second polarization rotator is a liquid-crystalline polarization rotator.

7. The optical signal generator according to claim 2, wherein the phase adjuster is a liquid-crystalline phase shifter.

8. The optical signal generator according to claim 1, wherein the first modulator and the second modulator are Mach-Zehnder modulators.

* * * * *